United States Patent
Yamano et al.

(10) Patent No.: US 7,835,086 B2
(45) Date of Patent: Nov. 16, 2010

(54) LENS BARREL AND IMAGING APPARATUS

(75) Inventors: Hiroki Yamano, Kanagawa (JP); So Miyasaka, Tokyo (JP); Kazuya Watanabe, Saitama (JP); Hisashi Sutoh, Saitama (JP); Hiromitsu Sakuraba, Saitama (JP)

(73) Assignees: Sony Corporation, Tokyo (JP); Tamron Co., Ltd., Saitama-shi (JP)

( * ) Notice: Subject to any disclaimer, the term of this patent is extended or adjusted under 35 U.S.C. 154(b) by 18 days.

(21) Appl. No.: 12/390,844

(22) Filed: Feb. 23, 2009

(65) Prior Publication Data

US 2009/0219625 A1  Sep. 3, 2009

(30) Foreign Application Priority Data

Feb. 29, 2008 (JP) .............................. 2008-049396

(51) Int. Cl.
*G02B 15/14* (2006.01)

(52) U.S. Cl. .................. 359/704; 359/687; 359/694
(58) Field of Classification Search .................. 359/687, 359/694, 695, 704

See application file for complete search history.

(56) References Cited

U.S. PATENT DOCUMENTS

| RE39,899 E * | 10/2007 | Miyauchi ..................... 359/687 |
| 2004/0136086 A1 | 7/2004 | Ohtake |
| 2005/0243437 A1 | 11/2005 | Hozumi et al. |

FOREIGN PATENT DOCUMENTS

| JP | 2004-212616 | 7/2004 |
| JP | 2006-23529 | 1/2006 |
| JP | 2007-93934 | 4/2007 |

* cited by examiner

*Primary Examiner*—David N Spector
(74) *Attorney, Agent, or Firm*—Oblon, Spivak, McClelland, Maier & Neustadt, L.L.P.

(57) ABSTRACT

The positioning of the first through the third lenses in the optical axis direction is performed in the state that the optical axes are aligned by press-fitting the outer circumference surfaces of the first through the third lenses of the second lens group respectively to the first through the third lens holding portions of the lens frame and the state that the first reference plane of the first lens and the second reference plane of the second lens are contacted and the third reference plane of the second lens and the fourth reference plane of the third lens are contacted.

5 Claims, 11 Drawing Sheets

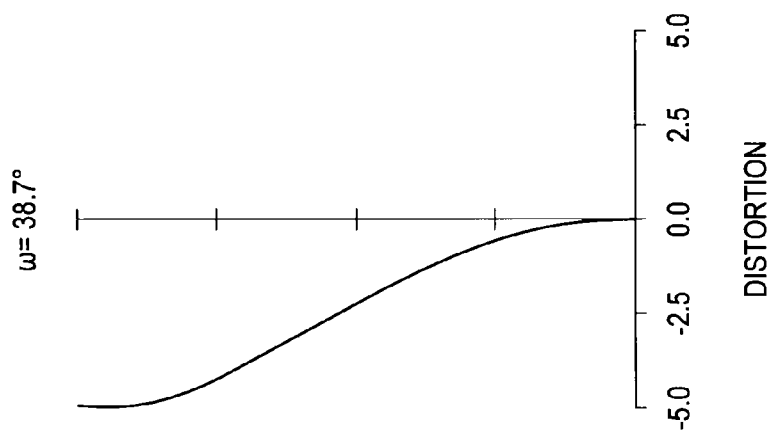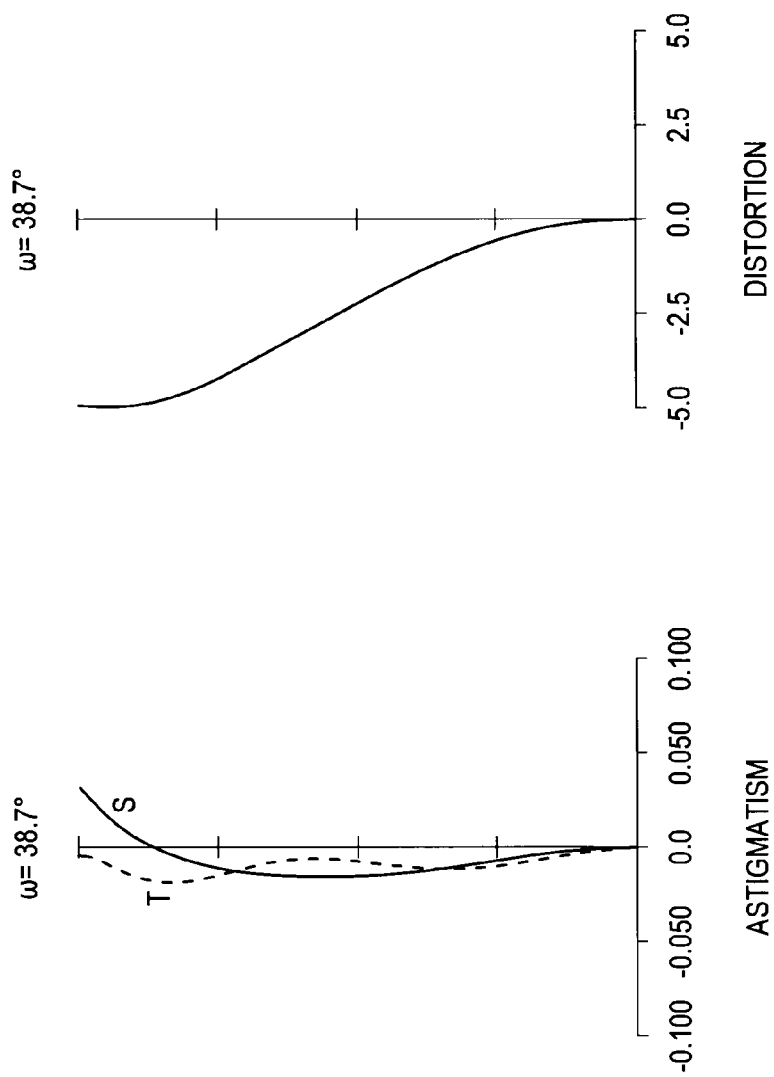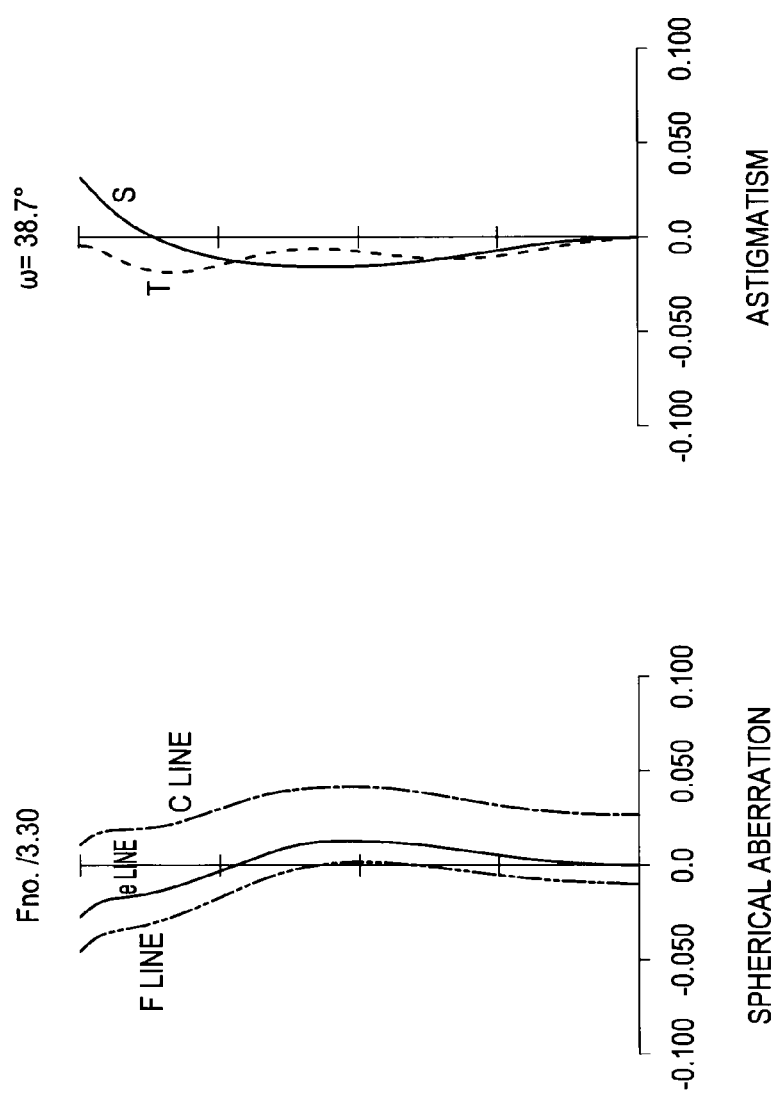

LENS BARREL AND IMAGING APPARATUS

CROSS-REFERENCE TO RELATED APPLICATION

The present invention contains subject matter related to Japanese Patent Application JP 2008-049396 filed in the Japan Patent Office on Feb. 29, 2008, the entire contents of which being incorporated herein by reference.

BACKGROUND OF THE INVENTION

1. Field of the Invention

The present invention relates to a lens barrel and an imaging apparatus.

2. Description of the Related Art

Recently, an imaging apparatus such as a digital camera and the like which utilizes a solid-state imaging device has been widely used.

In accordance with the spread of an imaging apparatus which utilizes a solid-state imaging device, further improvement of image quality has been desired. In particular, for a digital still camera etc. which utilizes a solid-state imaging device with a large number of pixels, a lens for imaging and especially a zoom lens which has superior imaging performance compliant for the solid-state imaging device with a large number of pixels has been desired.

Further, since there is a strong demand for the camera to be small and slim, a small and slim zoom lens which has high performance and a lens barrel which includes such a zoom lens have been desired. Further, since higher zooming power of an imaging lens is strongly preferred in recent years, the zoom lens which zooming power is over threefold and the lens barrel therewith have been desired even for a compact digital camera.

Generally, a positive-lead type zoom lens which includes a lens group at the most object side having positive refractive power has an advantage in enlarging the zooming power. Therefore, this type of zoom lens is widely used as being suitable for a high power zoom lens exceeding threefold magnification.

In particular, a four-group zoom lens including four lens groups which have positive, negative, positive and positive refractive powers in order from the object side is familiar as a compact zoom lens of the positive-lead type (see Japanese Patent Application Laid-Open No. 2004-212616 and Japanese Patent Application Laid-Open No. 2006-23529).

For a retractable type zoom lens which storage is improved by retracting the lens when the camera is not used (when not shooting), among the four-group zoom lenses, the third lens group which has positive refractive power and moves toward the object as a main variator when zooming is widely used.

This is because the four-group zoom lens of this type is suitable in view of sensitivity against decentering of the lens barrel structure and each lens group. Specifically, the type has an advantage in suppressing the effect of decentering to the quality of the photographic image.

In the case of the above four-group zoom type with the arrangement of positive, negative, positive and positive refractive powers in order from the object side and in which the third lens group functions as a main variator, the sensitivity against the decentering of each lens arranged in the third lens group which performs zooming becomes large. In other words, the effect of the decentering of each lens to the quality of the photographic image becomes large. Therefore, when arranging the lens into a lens frame during manufacturing, it may be necessary to perform attachment while adjusting the position with equipment such as an alignment device and the like (see Japanese Patent Application Laid-Open No. 2007-93934).

Further, the second lens group which functions as a supplemental variator when zooming performs the operation to significantly refract the light beam projecting through the first lens group. Accordingly, since the sensitivity against the decentering of each lens which is arranged in the group easily becomes large as in the case of the third lens group, it may be necessary to perform attachment while adjusting the position with equipment such as an alignment device and the like.

SUMMARY OF THE INVENTION

However, since miniaturization of the lens barrel, obtaining higher zooming power and obtaining higher optical performance are further desired recently, desired accuracy of the above lens attaching becomes markedly increased. Therefore, it becomes extremely difficult to satisfy the market needs at low cost.

Further, in the related art, in the case that the manufacturing of the second lens group is performed without using equipment such as the above alignment device and the like, there is a desire to decrease the sensitivity against the lens decentering within the second lens group with the optical design. Accordingly, the degree of freedom in the optical design is greatly narrowed. In addition, since the molding accuracy of the lens frame for storing the second lens group is highly desired, it becomes extremely difficult to maintain the yield during mass production of the lens barrel at a high level.

Here, such issues are not limited to the four-group type of positive, negative, positive and positive. The issues also occur to a similar lens barrel which has at least four lens groups of positive, negative, positive and positive in order from the object side (for example, a five-group type lens barrel by simply adding a field lens at the image side of the four lens groups of positive, negative, positive and positive).

The present invention addresses the above-identified issues. There is a need for providing a lens barrel which has an advantage in actualizing higher performance while performing miniaturization and cost reduction and providing an imaging apparatus which adopts the lens barrel.

According to an embodiment of the present invention, there is provided a lens barrel which includes a photographing optical system introducing an object image to an imaging device, a zoom lens being included in the photographing optical system, and a barrel accommodating the zoom lens; and in which the zoom lens includes a first lens group having positive refractive power, a second lens group having negative refractive power, a third lens group having positive refractive power and a fourth lens group having positive refractive power, arranged in order from the object side toward the imaging device side; the second lens group includes a first lens having a negative refractive power, a second lens having a negative refractive power whose diameter is smaller than that of the first lens, and a third lens having a positive refractive power whose diameter is smaller than that of the second lens, arranged in order from the object side toward the imaging device side; the barrel includes a lens frame to which a first inner circumference surface, a second inner circumference surface and a third inner circumference surface are formed on the same axis; the first lens, the second lens and the third lens are press-fitted at the outer circumferences thereof respectively to the first inner circumference surface, the second inner circumference surface and the third inner circumference surface so as to be accommodated in the lens frame; the first lens is formed so that both lens faces at the object side and the imaging device side shape convex toward the object side and the curvature of the lens face at the imaging device side is larger than that of the lens face at the object side; the second lens is formed so that both lens faces at the object side and the imaging device side shape concave so that the center portions of the lens faces are to become closer to each other; the third lens is formed so that a lens face at the object side shapes convex toward the object side; a ring-shaped first reference plane extending on a plane which is perpendicular to the optical axis of the first lens is formed at the periphery of the lens face at the imaging device side of the first lens; a ring-shaped second reference plane extending on a plane which is perpendicular to the optical axis of the second lens is formed at the periphery of the lens face at the object side of the second lens; a ring-shaped third reference plane extending on a plane which is perpendicular to the optical axis of the second lens is formed at the periphery of the lens face at the imaging device side of the second lens; a ring-shaped fourth reference plane extending on a plane which is perpendicular to the optical axis of the third lens is formed at the periphery of the lens face at the object side of the third lens; and positioning of the first lens, the second lens and the third lens in the optical axis direction thereof is performed in the state that the first reference plane and the second reference plane are contacted and the third reference plane and the fourth reference plane are contacted.

According to another embodiment of the present invention, there is provided an imaging apparatus having a lens barrel which includes a photographing optical system introducing an object image to an imaging device, a zoom lens being included in the photographing optical system, and a barrel accommodating the zoom lens; and in which the zoom lens includes a first lens group having positive refractive power, a second lens group having negative refractive power, a third lens group having positive refractive power and a fourth lens group having positive refractive power, arranged in order from the object side toward the imaging device side; the second lens group includes a first lens having a negative refractive power, a second lens having a negative refractive power whose diameter is smaller than that of the first lens, and a third lens having a positive refractive power whose diameter is smaller than that of the second lens, arranged in order from the object side toward the imaging device side; the barrel includes a lens frame to which a first inner circumference surface, a second inner circumference surface and a third inner circumference surface are formed on the same axis; the first lens, the second lens and the third lens are press-fitted at the outer circumferences thereof respectively to the first inner circumference surface, the second inner circumference surface and the third inner circumference surface so as to be accommodated in the lens frame; the first lens is formed so that both lens faces at the object side and the imaging device side shape convex toward the object side and the curvature of the lens face at the imaging device side is larger than that of the lens face at the object side; the second lens is formed so that both lens faces at the object side and the imaging device side shape concave so that the center portions of the lens faces are to become closer to each other; the third lens is formed so that a lens face at the object side shapes convex toward the object side; a ring-shaped first reference plane extending on a plane which is perpendicular to the optical axis of the first lens is formed at the periphery of the lens face at the imaging device side of the first lens; a ring-shaped second reference plane extending on a plane which is perpendicular to the optical axis of the second lens is formed at the periphery of the lens face at the object side of the second lens; a ring-shaped third reference plane extending on a plane which is perpendicular to the optical axis of the second lens is formed at the periphery of the lens face at the imaging device side of the second lens; a ring-shaped fourth reference plane extending on a plane which is perpendicular to the optical axis of the third lens is formed at the periphery of the lens face at the object side of the third lens; and positioning of the first lens, the second lens and the third lens in the optical axis direction thereof is performed in the state that the first reference plane and the second reference plane are contacted and the third reference plane and the fourth reference plane are contacted.

According to the embodiments of the present invention described above, it becomes advantageous in ensuring the alignment accuracy of the first through the third lenses and in ensuring the positioning accuracy of the first through the third lenses in the optical axis direction. Accordingly, it becomes advantageous in obtaining higher performance of the lens barrel, reduction of the manufacturing cost and miniaturization.

BRIEF DESCRIPTION OF THE DRAWINGS

FIG. 12 is a longitudinal aberration diagram which shows spherical aberration at a middle-focal position of the zoom lens 16;

FIG. 13 is a longitudinal aberration diagram which shows astigmatism at the middle-focal position of the zoom lens 16;

FIG. 14 is a longitudinal aberration diagram which shows distortion at the middle-focal position of the zoom lens 16;

DETAILED DESCRIPTION OF THE PREFERRED EMBODIMENTS

Figure 1:
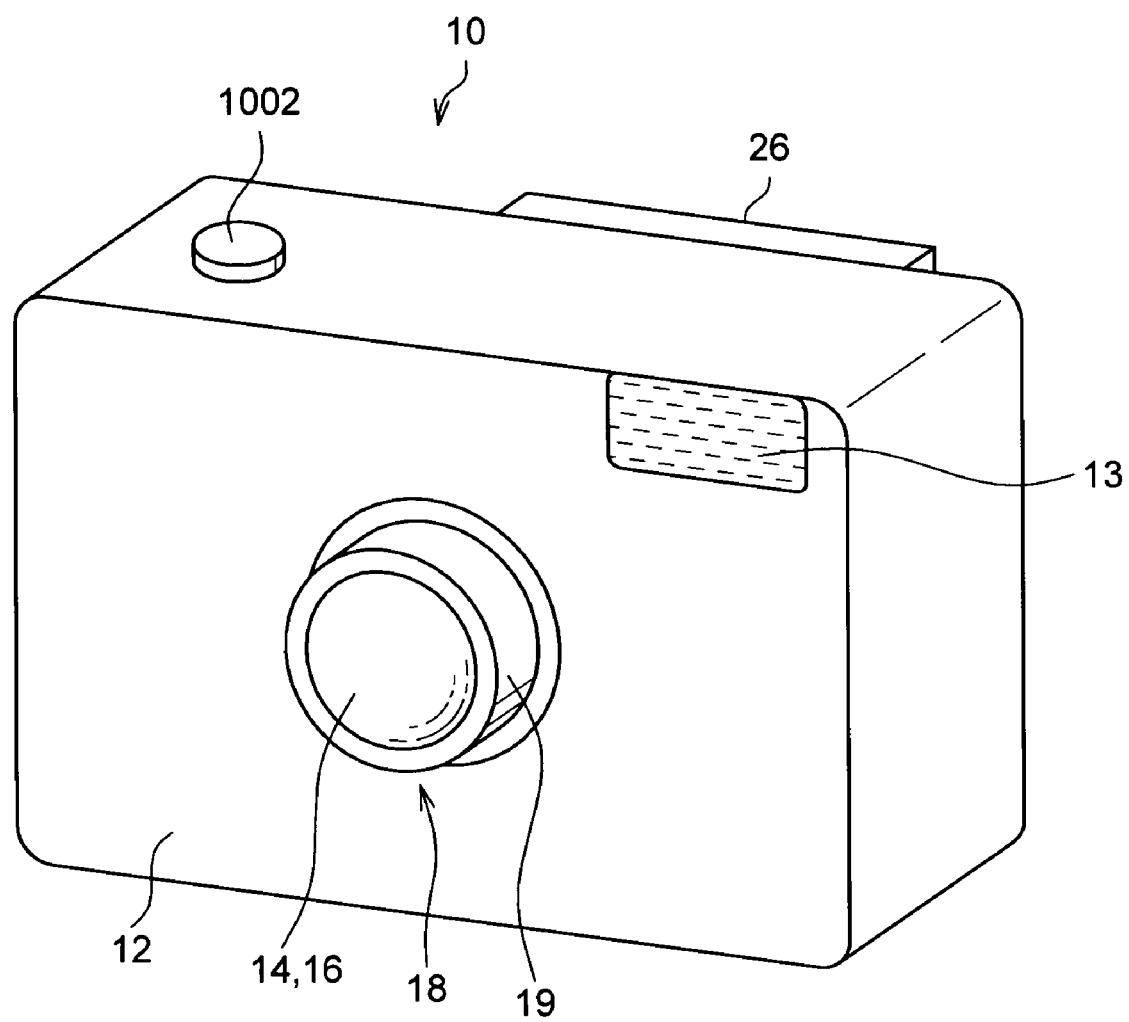
FIG. 1 is a perspective view of an imaging apparatus 10 according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Next, an embodiment of the present invention is described with reference to the drawings.

Figure 2:
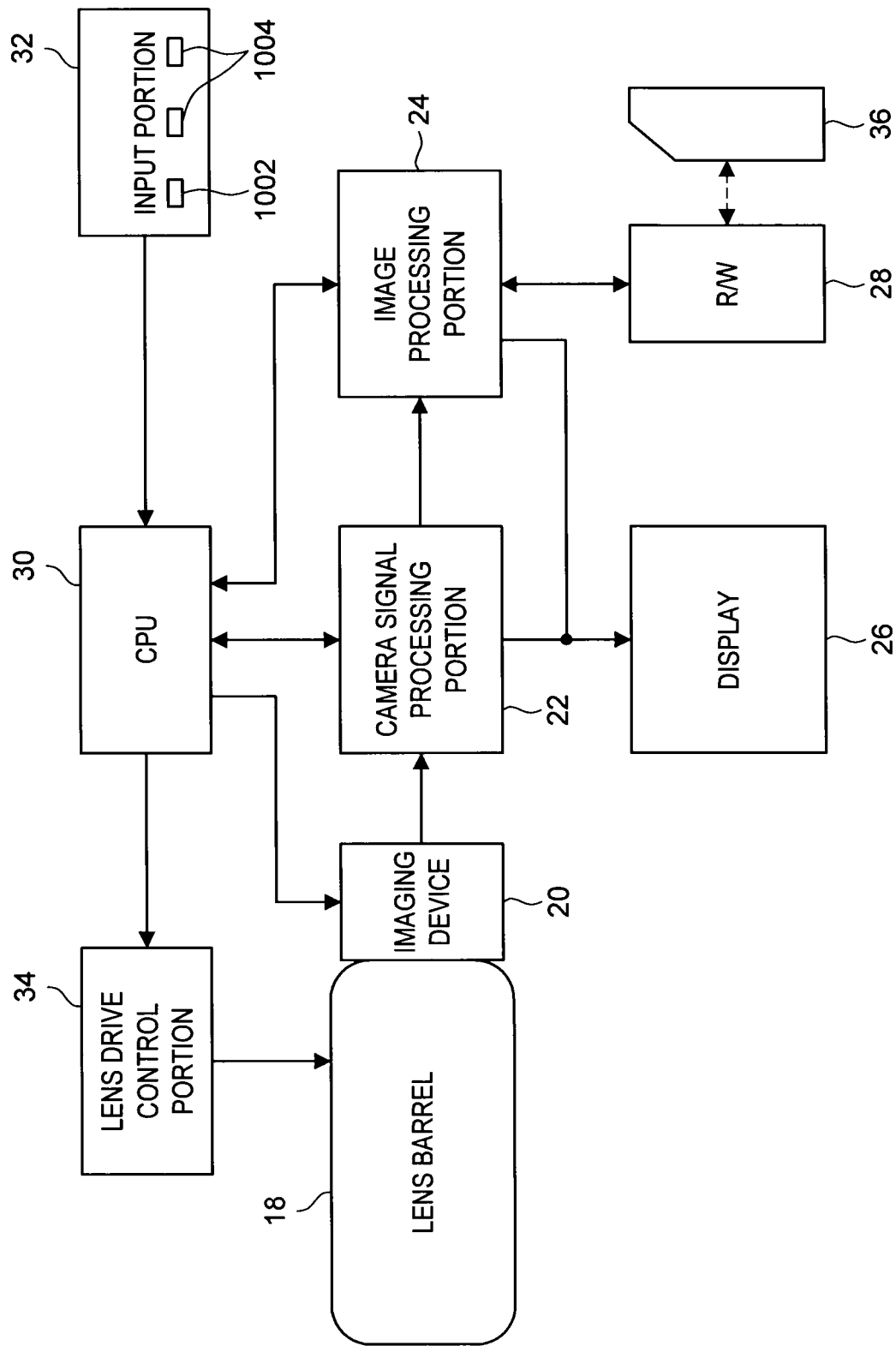
FIG. 2 is a block diagram which shows a structure of a control system of the imaging apparatus 10 according to the embodiment.

FIG. 1 is a perspective view of an imaging apparatus 10 according to the embodiment and FIG. 2 is a block diagram which shows a structure of a control system of the imaging apparatus 10 according to the embodiment.

As shown in FIG. 1, the imaging apparatus 10 of the present embodiment is a digital still camera and has a case 12 which structures the external package. Here, in the present specification, the object side is to be the front side and the opposite side is to be the rear side.

A lens barrel 18 is disposed at the rather right side of the front face of the case 12.

The lens barrel 18 includes a photographing optical system 14 which introduces an object image to an imaging device 20 (see FIG. 2), a zoom lens 16 which is included in the photographing optical system 14 and a barrel 19 which accommodates the zoom lens 16.

In the present embodiment, the lens barrel 18 is a so-called retractable type in which the lens barrel 18 projects and retracts between a projecting position projecting frontward from the front face of the case 12 which is shown in FIG. 12 and a retracting position retracting to the front face of the case 12.

In this specification, the front side denotes the object side and the rear side denotes the imaging device 20 side.

A shutter release button 1002 is disposed at the upper end surface of the case 12. A plurality of operation switches 1004 (see FIG. 2) which performs a variety of operations such as on-off of power, switching between a photographing mode and a reproducing mode, and zooming operation etc. and a display 26 which displays a photographed image and the like are disposed at the rear face of the case 12.

Further, reference numeral 13 in FIG. 1 indicates a flash portion for emitting flash light as a supplemental light for photographing.

As shown in FIG. 2, the imaging apparatus 10 includes a camera signal processing portion 22, an image processing portion 24, an R/W (reader/writer) 28, a CPU 30, an input portion 32, a lens drive control portion 34 and the like in addition to the imaging device 20 and the display 26.

The imaging device 20 has an imaging face and includes a CCD, a C-MOS sensor and the like for generating an imaging signal after photographing an object image which is formed at the imaging face by the photographing optical system 14.

The camera signal processing portion 22 generates the image signal by performing various signal processes which are known in the related art against the imaging signal supplied from the imaging device 20, such as analog-digital conversion, noise reduction, image quality correction, conversion to luminance/chrominance signal and the like.

The image processing portion 24 performs a storing and reproducing process of the image signal which is supplied from the camera signal processing portion 22. The image processing portion 24 performs a process of compression encoding and expansion decoding against the image signal based on a predetermined image data format, a conversion process of data specification such as resolution etc. and the like.

The display 26 displays the photographed image and the like based on the image signal which is supplied from the camera signal processing portion 22 or the image processing portion 24. For the display 26, various display devices which are known in the related art such as a liquid crystal display device, an organic electroluminescence display device or the like is adoptable.

The R/W (reader/writer) 28 writes the image data encoded by the image processing portion 24 at a storage medium 36 and supplies the image data stored at the storage medium 36 to the image processing portion 24 after reading.

The storage medium 36 stores the image data and can be a memory card (semiconductor memory) etc. which is detachable from a card slot (not shown in the figure) disposed at the case 12.

The input portion 32 includes the above shutter release button 1002 and the plurality of operation switches 1004 etc. and outputs a direction input signal in correspondence with the user's operation to the CPU 30.

The lens drive control portion 34 performs the controlling of an actuator (a motor) which moves a predetermined lens in the optical axis direction among a plurality of lenses which are included in the zoom lens 16 based on a control signal from the CPU 30. Specifically, the zoom lens 16 includes a plurality of lenses as mentioned later. By moving some lens among the plurality of lenses, focusing operation and zooming operation are performed or moving operation of the lens barrel 18 between the projecting position and the retracting position is performed.

The CPU 30 controls the camera signal processing portion 22, the image processing portion 24, the lens drive control portion 34 and the like based on the direction input signal etc. which is supplied from the input portion 32.

Next, the operation of the imaging apparatus 10 is briefly described.

In a standby state of the photographing, the image signal generated by the imaging device 20 is output to the display 26 via the camera signal processing portion 22 and displayed as a camera-through image under the control of the CPU 30.

Further, when a direction input signal for zooming is input from the input portion 32, the CPU 30 outputs a control signal to the lens drive control portion 34. The predetermined lens in the zoom lens 16 is moved based on the control of the lens drive control portion 34, and the zooming power is changed.

Then, when the shutter release button 1002 is depressed and the shutter is snapped in accordance with the direction input signal from the input portion 32, the photographed image signal is output from the camera signal processing portion 22 to the image processing portion 24 and the compression encoding process is performed. The image signal is then converted into digital data of a predetermined format. The converted data is output to the R/W 28 and stored at the storage medium 36.

Here, the focusing is performed by moving the predetermined lens in the zoom lens 16 by the lens drive control portion 34 based on the control signal from the CPU 30 when the shutter release button 1002 is depressed halfway or the shutter release button 1002 is fully depressed for storing, or the like, for example.

Further, in the case that the image data stored at the storage medium 36 is reproduced, the predetermined image data is read from the storage medium 36 by the R/W 28. After the expansion decoding process is performed at the image processing portion 24, the reproduction image data is output to the display 26. In this manner, the reproduction image is displayed.

Next, the lens barrel 18 according to an embodiment of the present invention is described in detail.

As mentioned above, the lens barrel 18 includes the barrel 19 and the barrel 19 accommodates the zoom lens 16.

Figure 3:
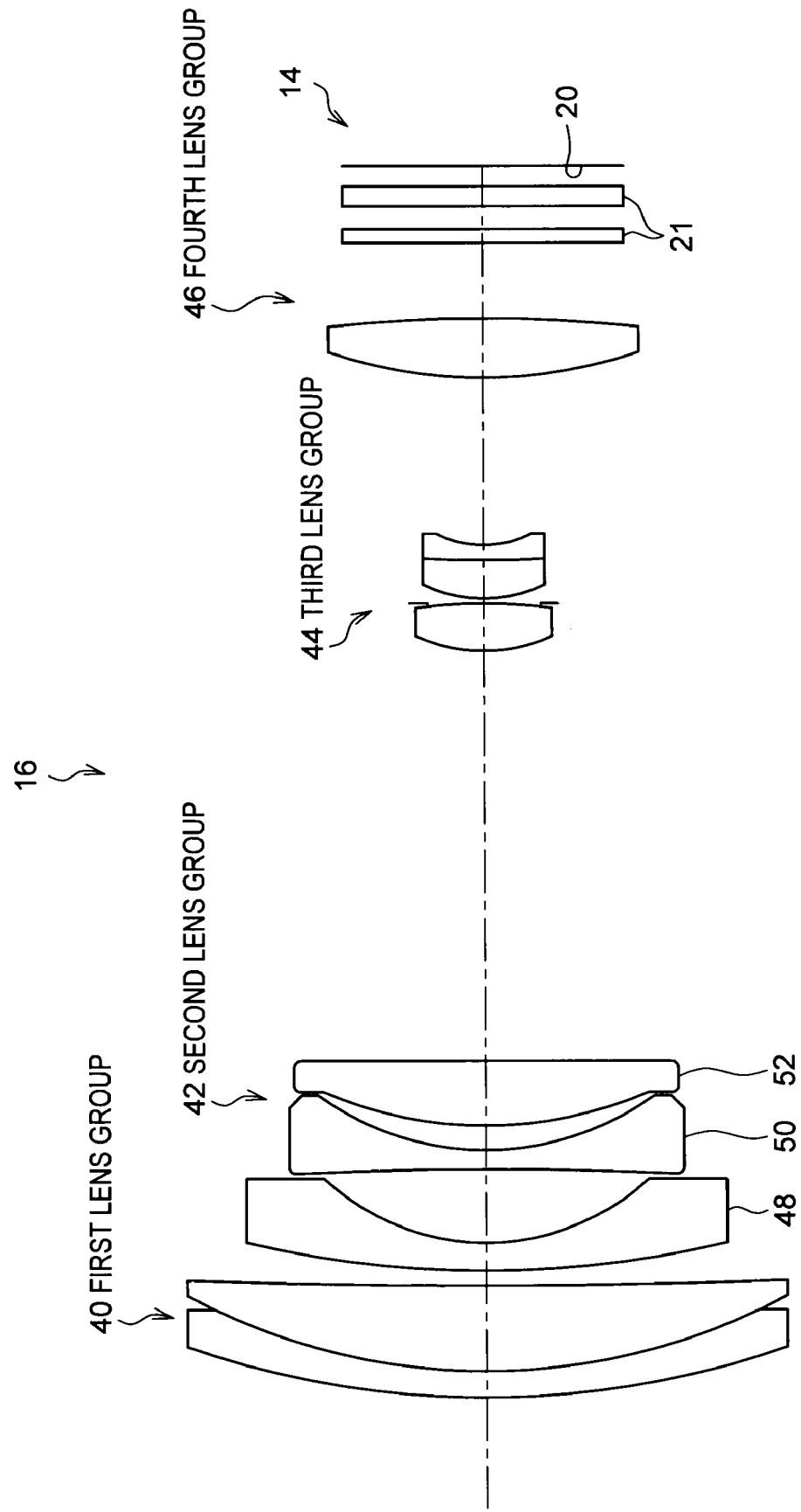
FIG. 3 is an explanatory drawing which shows a structure of a zoom lens 16 which is accommodated in a barrel 19.

FIG. 3 is an explanatory drawing which shows a structure of the zoom lens 16 which is accommodated in the barrel 19.

(Zoom Lens 16 and Lens Barrel 18)

The zoom lens 16 includes a first lens group 40, a second lens group 42, a third lens group 44 and a fourth lens group 46 which are arranged on the optical axis of the photographing optical system 14 in order from the object side toward the imaging device 20 side. The second lens group 42 is retained by a lens frame 54 (in FIG. 4) which is described later.

The first lens group 40 has positive refractive power. The second lens group 42 has negative refractive power. The third lens group 44 has positive refractive power. Then, the fourth lens group 46 has positive refractive power.

In FIG. 3, reference numeral 21 denotes an optical filter which is arranged between the fourth lens group 46 and the imaging device 20.

In the present embodiment, the third lens group 44 functions as a main variator when zooming by moving in the optical axis direction of the photographing optical system 14. The second lens group 42 functions as a supplemental variator when zooming by moving in the optical axis direction of the photographing optical system 14.

Accordingly, the second lens group 42 performs the operation to largely refract the light beam projecting through the first lens group 40.

The second lens group 42 includes three pieces of lenses which are a first lens 48, a second lens 50 and a third lens 52 arranged on the optical axis of the photographing optical system 14 in order from the object side toward the imaging device 20 side.

(First Lens 48)

Figure 4:
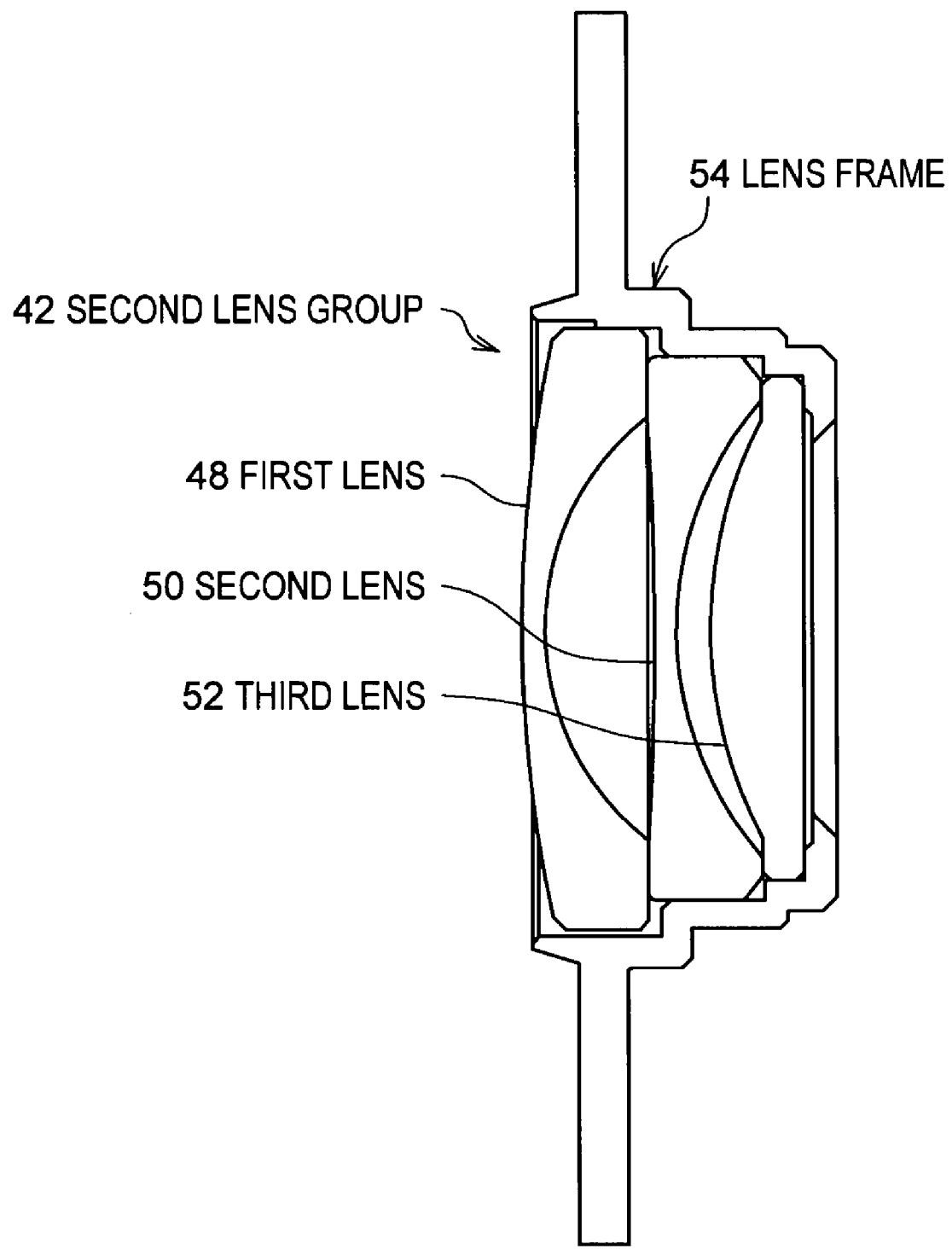
FIG. 4 is an explanatory drawing of a lens frame 54 in which a second lens group 42 is assembled.
Figure 5:
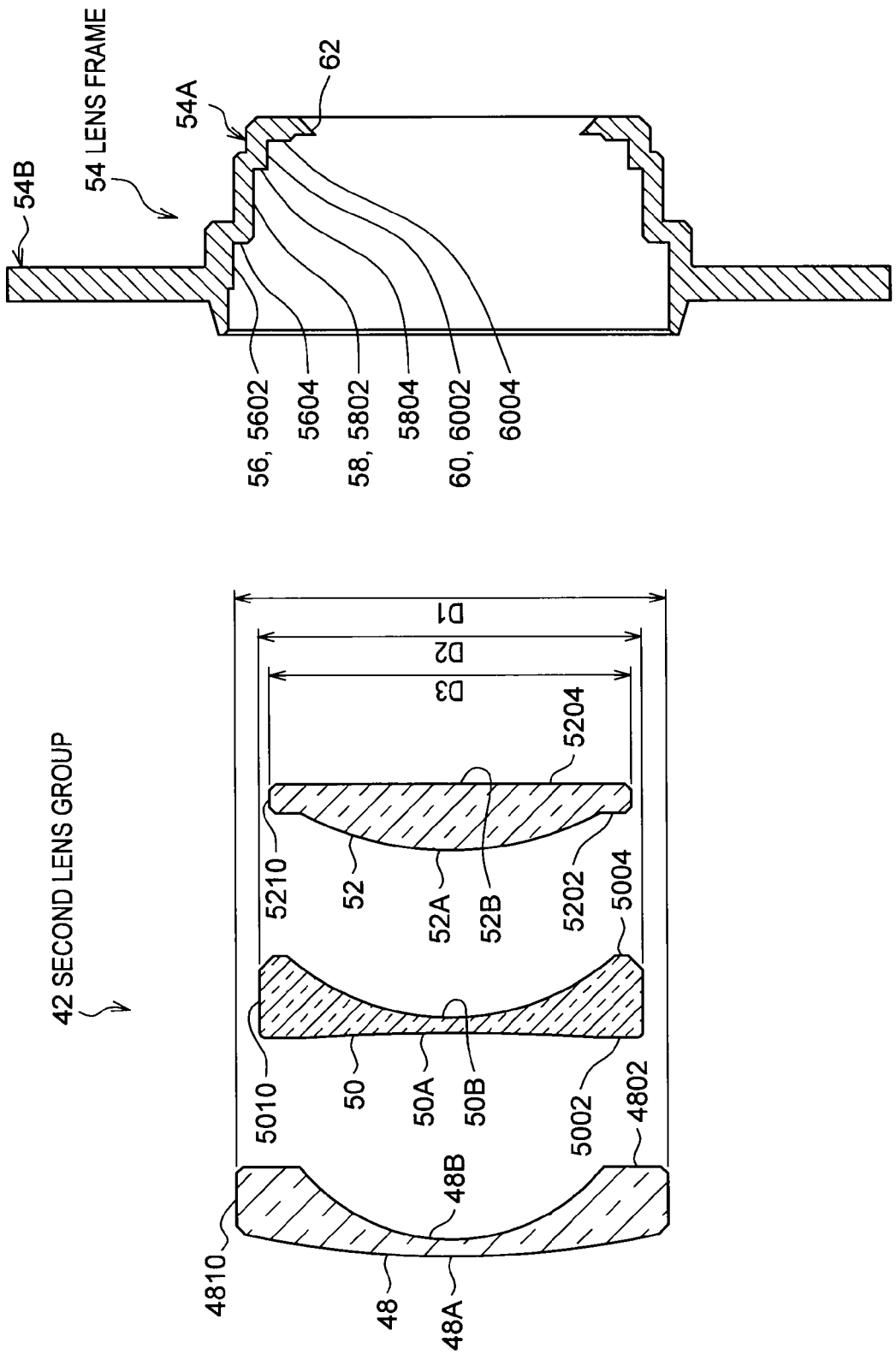
FIG. 5 is an exploded view of the second lens group 42 and the lens frame 54.

FIG. 4 is an explanatory drawing of the lens frame 54 in which the second lens group 42 is assembled, and FIG. 5 is an exploded view of the second lens group 42 and the lens frame 54.

The first lens 48 has a negative refractive power.

The first lens 48 has a lens face 48A at the object side and a lens face 48B at the imaging device 20 side. The two lens faces 48A, 48B both shape convex toward the object side. In other words, the first lens 48 is the so-called meniscus lens in which the curvatures of the two lens faces 48A, 48B are of the same sign.

Further, in the present embodiment, the first lens 48 is formed so that the curvature of the lens face 48B at the imaging device 20 side is larger than that of the lens face 48A at the object side.

A ring-shaped first reference plane 4802 extending on a plane which is perpendicular to the optical axis of the first lens 48 is formed at the periphery of the lens face 48B at the imaging device 20 side of the first lens 48.

In the present embodiment, the first reference plane 4802 is formed to be ring-shaped having the optical axis of the first lens 48 as the center.

The outer circumference surface 4810 of the first lens 48 is formed as a cylindrical surface with a diameter of D1 having the optical axis of the first lens 48 as the center.

In the present embodiment, the first lens 48 is formed by machining and polishing glass material.

(Second Lens 50)

The second lens 50 has a negative refractive power.

The second lens 50 has a lens face 50A at the object side and a lens face 50B at the imaging device 20 side. The two lens faces 50A, 50B both shape concave in which the center portions are to become closer to each other. In other words, the second lens 50 is a concave lens at both faces.

A ring-shaped second reference plane 5002 extending on a plane which is perpendicular to the optical axis of the second lens 50 is formed at the periphery of the lens face 50A at the object side of the second lens 50.

A ring-shaped third reference plane 5004 extending on a plane which is perpendicular to the optical axis of the second lens 50 is formed at the periphery of the lens face 50B at the imaging device 20 side of the second lens 50.

In the present embodiment, the second reference plane 5002 and the third reference plane 5004 are formed ring-shaped having the optical axis of the second lens 50 as the center.

The outer circumference surface 5010 of the second lens 50 is formed as a cylindrical surface with a diameter of D2 having the optical axis of the second lens 50 as the center. The diameter D2 of the outer circumference surface 5010 of the second lens 50 is smaller than the diameter D1 of the outer circumference surface 4810 of the first lens 48.

In the present embodiment, the second lens 50 is formed by machining and polishing glass material.

(Third Lens 52)

The third lens 52 has a positive refractive power.

The third lens 52 has a lens face 52A at the object side and a lens face 52B at the imaging device 20 side. The lens face 52A at the object side shapes convex toward the object side. The lens face 52B at the imaging device 20 side extends on a plane which is perpendicular to the optical axis of the third lens 52.

A ring-shaped fourth reference plane 5202 extending on a plane which is perpendicular to the optical axis of the third lens 52 is formed at the periphery of the lens face 52A at the object side of the third lens 52.

A ring-shaped fifth reference plane 5204 extending on the same plane as the lens face 52B is formed at the periphery of the lens face 52B at the imaging device 20 side of the third lens 52.

In the present embodiment, the fourth reference plane 5202 and the fifth reference plane 5204 are formed ring-shaped having the optical axis of the third lens 52 as the center.

The outer circumference surface 5210 of the third lens 52 is formed as a cylindrical surface with a diameter of D3 having the optical axis of the third lens 52 as the center. The diameter D3 of the outer circumference surface 5210 of the third lens 52 is smaller than the diameter D2 of the outer circumference surface 5010 of the second lens 50.

In the present embodiment, the third lens 50 is formed by using a die and molding glass material which is for molding lens. In other words, the third lens 50 is molded by a glass molding process.

(Lens Frame 54)

The lens frame 54 includes a cylindrical wall portion 54A which retains the second lens group 42 and a ring-shaped wall portion 54B extending as a ring-shape from a position of the object side of the outer circumference surface of the cylindrical wall portion 54A on a plane which is perpendicular to the optical axis of the second lens group 42.

The lens frame 54 is formed by filling synthetic resin material into a die.

The lens frame 54 is arranged so as to be capable of moving in the optical axis direction of the zoom lens 16 in the state that the optical axis of the second lens group 42 is aligned to the optical axis of the zoom lens 16, for example, by respectively inserting guide shafts of the barrel 19 into a plurality of bearing bores which are disposed at the ring-shaped wall portion 54B (not shown in figures). Therefore, by moving the lens frame 54, the second lens group 42 moves in the optical axis direction of the zoom lens 16 in the state that the optical axis of the second lens group 42 is aligned to the optical axis of the zoom lens 16.

The cylindrical wall portion 54A includes a first lens holding portion 56, a second lens holding portion 58 and a third lens holding portion 60 arranged in order from the object side toward the imaging device 20 side.

The first lens holding portion 56 includes a first inner circumference surface 5602 and a ring-shaped first end surface 5604.

The first inner circumference surface 5602 is formed with the inner diameter so that the outer circumference surface 4810 of the first lens 48 is press-fitted thereto.

The first end surface 5604 is formed with the dimension so as to face the periphery of the first reference plane 4802 of the first lens 48.

The second lens holding portion 58 includes a second inner circumference surface 5802 and a ring-shaped second end surface 5804.

The second inner circumference surface 5802 is formed by the diameter so that the outer circumference surface 5010 of the second lens 50 is press-fitted thereto.

The second end surface 5804 is formed with the dimension so as to face the periphery of the third reference plane 5004 of the second lens 50.

The third lens holding portion 60 includes a third inner circumference surface 6002 and a ring-shaped third end surface 6004.

The third inner circumference surface 6002 is formed by the diameter so that the outer circumference surface 5210 of the third lens 52 is press-fitted thereto.

The third end surface 6004 is formed with the dimension so as to face the periphery of the fifth reference plane 5204 of the third lens 52. The third end surface 6004 extending on a plane which is perpendicular to the center axis of the third inner circumference surface 6002 is formed as a positioning surface being capable to contact the fifth reference plane 5204. An aperture 62 is formed by an inner circumference portion of the third end surface 6004.

The first inner circumference surface 5604, the second inner circumference surface 5804 and the third inner circumference surface 6004 which are mentioned above are arranged on the same axis.

(Assembling of Second Lens Group 42 into Lens Frame 54)

Next, assembling of the second lens group 42 into the lens frame 54 is described.

Figure 6:
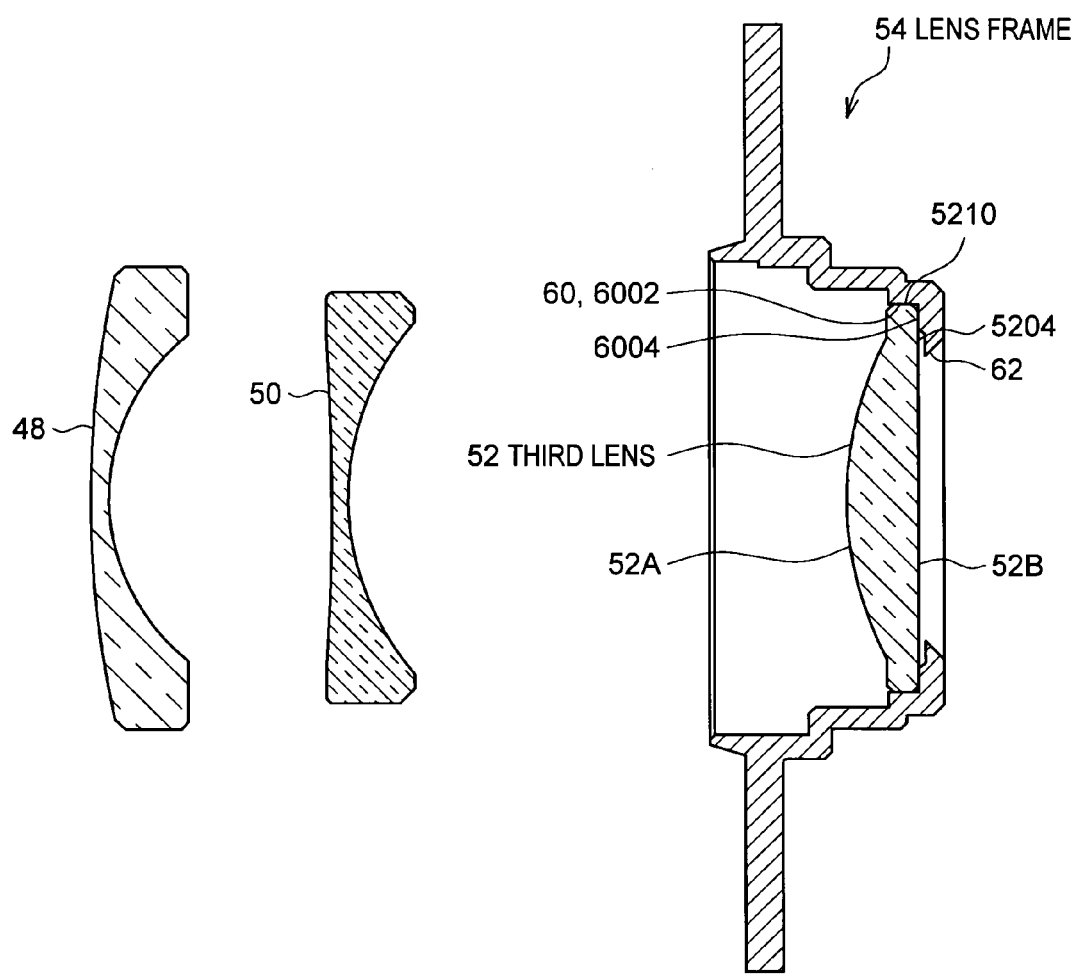
FIG. 6 is an explanatory drawing of when a first lens 48 is assembled into the lens frame 54.
Figure 7:
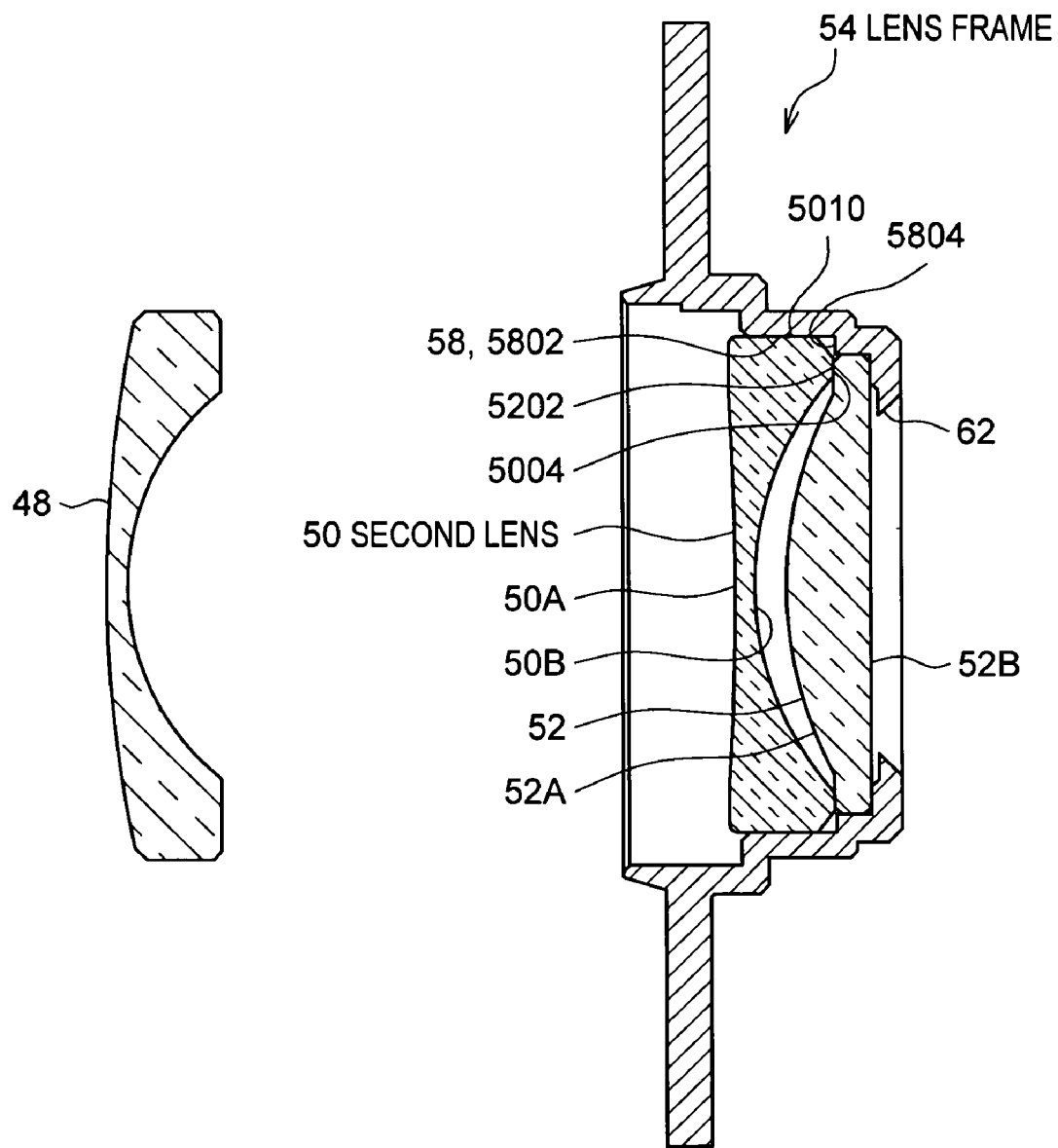
FIG. 7 is an explanatory drawing of when a second lens 50 is assembled into the lens frame 54.
Figure 8:
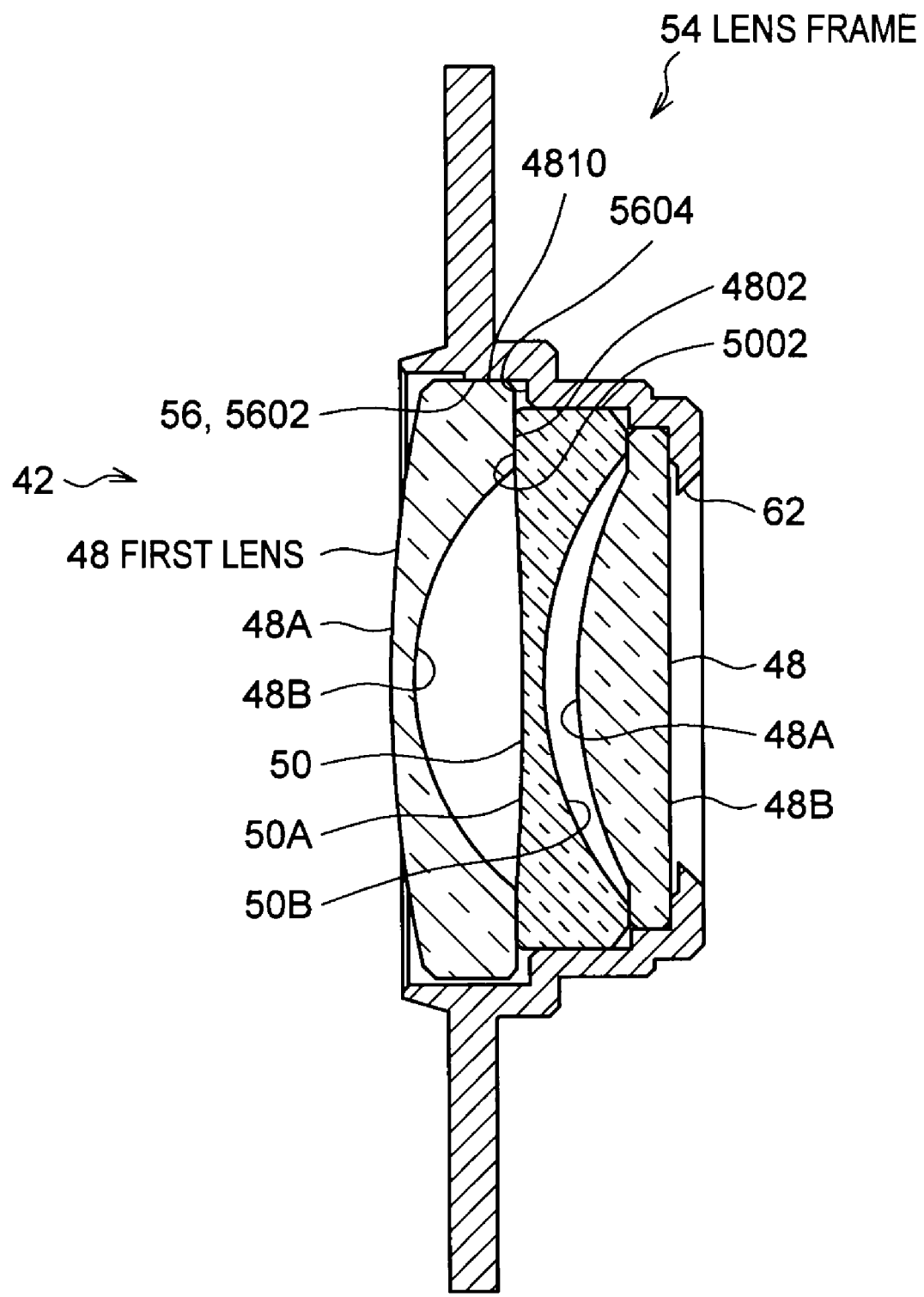
FIG. 8 is an explanatory drawing of when a third lens 52 is assembled into the lens frame 54.

FIG. 6 through FIG. 8 are explanatory drawings of when the first lens 48, the second lens 50 and the third lens 52 are assembled into the lens frame 54.

First, as shown in FIG. 6, the third lens 52 is inserted into the third lens holding portion 60 while the lens face 52B of the third lens 52 faces the aperture 62 of the lens frame 54. The outer circumference surface 5210 of the third lens 52 is press-fitted to the third inner circumference surface 6002 of the third lens holding portion 60, and the fifth reference plane 5204 of the third lens 52 is contacted to the third end surface 6004 of the lens frame 54.

Next, as shown in FIG. 7, the second lens 50 is inserted into the second lens holding portion 58 while the lens face 50B of the second lens 50 faces the lens face 52A of the third lens 52 which is previously assembled into the lens frame 54. The outer circumference surface 5010 of the second lens 50 is press-fitted to the second inner circumference surface 5802 of the second lens holding portion 58, and the third reference plane 5004 of the second lens 50 is contacted to the fourth reference plane 5202 of the third lens 52.

Next, as shown in FIG. 8, the first lens 48 is inserted into the first lens holding portion 56 while the lens face 48B of the first lens 48 faces the lens face 50A of the second lens 50 which is previously assembled into the lens frame 54. The outer circumference surface 4810 of the first lens 48 is press-fitted to the first inner circumference surface 5602 of the first lens holding portion 56, and the first reference plane 4802 of the first lens 48 is contacted to the second reference plane 5002 of the second lens 50.

In this manner, the first lens 48, the second lens 50 and the third lens 52 (the second lens group 42) are assembled into the lens frame 54.

Then, after the second lens group 42 is assembled into the lens frame 54, dropping of the second lens group 42 from the lens frame 54 can be prevented by adhesion of the first lens 48 and the first lens holding portion 56 with adhesive or by attaching a ring-shaped cap member which locks the periphery of the lens face 48A of the first lens 48 to the lens frame 54, or the like.

In this manner, the second lens group 42 is assembled into the lens frame 54. Accordingly, since the outer circumference surface 5210 of the third lens 52 is press-fitted to the third inner circumference surface 6002 of the third lens holding portion 60, the optical axis of the third lens 52 is aligned to the center axis of the third inner circumference surface 6002 and the optical axis of the third lens 52 becomes perpendicular to a plane which includes the third end surface 6004. In addition, by contacting the fifth reference plane 5204 to the third end surface 6004, positioning of the third lens 52 against the lens frame 54 in the optical axis direction is performed.

Further, since the outer circumference surface 5010 of the second lens 50 is press-fitted to the second inner circumference surface 5802 of the second lens holding portion 58, the optical axis of the second lens 50 is aligned to the center axis of the second inner circumference surface 5802. In addition, by contacting the third reference plane 5004 to the fourth reference plane 5202, positioning of the second lens 50 against the third lens 52 in the optical axis direction is performed.

Further, since the outer circumference surface 4810 of the first lens 48 is press-fitted to the first inner circumference surface 5602 of the first lens holding portion 56, the optical axis of the first lens 48 is aligned to the center axis of the first inner circumference surface 5602. In addition, by contacting the first reference plane 4802 to the second reference plane 5002, positioning of the first lens 48 against the second lens 50 in the optical axis direction is performed.

Therefore, the optical axes of the first lens 48, the second lens 50 and the third lens 52 are aligned to one another. That is, the optical axes of the first lens 48, the second lens 50 and the third lens 52 extend on the same axis and have no tilt (inclination). In addition, the positioning of the first lens 48, the second lens 50 and the third lens 52 in the optical axis direction is performed.

As described above, in the present embodiment, the outer circumference surfaces 4810, 5010, 5210 of the first through the third lenses 48, 50, 52 which are included in the second lens group 42 are respectively press-fitted to the first through the third lens holding portions 56, 58, 60 so that the optical axes are aligned. In addition, the first reference plane 4802 of the first lens 48 and the second reference plane 5002 of the second lens 50 are contacted and the third reference plane 5004 of the second lens 50 and the fourth reference plane 5202 of the third lens 52 are contacted so that positioning of the first through the third lenses 48, 50, 52 in the optical axis direction is performed.

Therefore, it becomes advantageous in ensuring the alignment accuracy of the first through the third lenses 48, 50, 52, in ensuring the positioning accuracy of the first through the third lenses 48, 50, 52 in the optical axis direction, and in obtaining higher performance of the lens barrel 18. Moreover, it becomes advantageous in performing reduction of the manufacturing cost because equipment for the alignment may not be necessary and the tact time for aligning operation can be reduced.

Further, since the alignment and the positioning in the optical axis direction of the first through the third lenses 48, 50, 52 of the second lens group 42 can be performed with a very simple structure such as disposing the first through the third lens holding portions 56, 58, 60 at the lens frame 54, simplification of the structure of the lens barrel 18 can be performed. Therefore, it also becomes advantageous in performing miniaturization and cost reduction of the lens barrel 18.

In particular, with the lens barrel 18 in which the zoom lens 16 has the first through the fourth lens groups 40, 42, 44, 46 for obtaining higher zooming power and in which the second lens group 42 functions as a variator which performs the operation to significantly refract the light beam projecting through the first lens group 40, the sensitivity against the decentering of the first through the third lenses 48, 50, 52 which are included in the second lens group 42 easily becomes large. Accordingly, the decentering aberration easily occurs. However, in the present embodiment, since the lens attachment accuracy of the second lens group 42 can be improved with the simple structure as mentioned above, it becomes extremely advantageous in actualizing higher performance and cost reduction of the lens barrel 18 which has the zoom lens 16 of a high zooming power.

In general, lenses which are optical parts have extremely high dimensional accuracy upon molding compared with plastic molding parts which are widely adopted for a lens barrel and a lens frame.

Accordingly, in the present embodiment, the first lens 48 and the second lens 50 are assembled into the lens frame 54 in the state that the first reference plane 4802 and the second reference plane 5002 are contacted, and the second lens 50 and the third lens 52 are assembled into the lens frame 54 in the state that the third reference plane 5004 and the fourth reference plane 5202 are contacted. Accordingly, the relative tilt decentering and the interval tolerance among the first through the third lenses 48, 50, 52 can be considerably decreased. Therefore, it becomes advantageous for obtaining higher performance of the lens barrel 18.

Further, in the present embodiment, the first lens 48 and the second lens 50 are assembled into the lens frame 54 in the state that the first reference plane 4802 and the second reference plane 5002 are contacted, and the second lens 50 and the third lens 52 are assembled into the lens frame 54 in the state that the third reference plane 5004 and the fourth reference plane 5202 are contacted. In other words, the first through the third lenses 48, 50, 52 are assembled into the lens frame 54 as being intimately contacted in the optical axis direction.

Therefore, the space in the optical axis direction occupied by the first through the third lenses 48, 50, 52 can be considerably decreased. Accordingly, since the center thickness of the second lens group 42 can be designed to be slimmer than before, it becomes advantageous for performing miniaturization of the lens barrel 18.

Further, even in the case that a shield sheet or black painting for reducing stray light which causes a ghost flare etc. is applied between the first reference plane 4802 and the second reference plane 5002 or between the third reference plane 5004 and the fourth reference plane 5202, it becomes advantageous for obtaining slimmer center thickness of the second lens group 42 while ensuring the lens attachment accuracy by arranging the sheet or the painting accurately at a uniform thickness.

Further, in the present embodiment, by forming the first lens 48 so that the curvature of the lens face 48B at the imaging device 20 side is larger than that of the lens face 48A at the object side, the space between the first reference plane 4802 and the lens face 48B in the optical axis direction of the first lens 48 is ensured. With this structure, the processability for forming the first reference plane 4802 at the periphery of the lens face 48B is ensured and the manufacturing easiness is enhanced.

Further, by forming the two lens faces 50A, 50B of the second lens 50 as concave shapes the space between the second reference plane 5002 and the lens face 50A in the optical axis direction of the second lens 50 is ensured and the space between the third reference plane 5004 and the lens face 50B in the optical axis direction of the second lens 50 is ensured. With this structure, the processability for forming the second reference plane 5002 and the third reference plane 5004 respectively at the peripheries of the lens faces 50A, 50B is ensured and the manufacturing easiness is enhanced.

With the third lens 52, the fourth reference plane 5202 is possible to be formed by a machining process. However, considering the machining cost and the optical performance of the entire system of the zoom lens 16, it is preferred to mold the third lens 52 by utilizing the glass molding process which is also capable of forming an aspheric surface.

Further, by molding the third lens 52 by the glass molding process, it becomes easy to form the fifth reference plane 5204 at the periphery of the lens face 52B at the imaging device 20 side of the third lens 52. Accordingly, by contacting the fifth reference plane 5204 of the third lens 52 with the third end surface 6004 of the third lens holding portion 60, it becomes advantageous in performing accurate positioning in the optical axis direction.

Consequently, by arranging the first lens 48, the second lens 50 and the third lens 52 of the second lens group 42 as mentioned above, it becomes advantageous in performing the improvement of the manufacturing accuracy, processability and mass productivity of each lens.

Further, in the present embodiment, the first inner circumference surface 5602, the second inner circumference surface 5802 and the third inner circumference surface 6002 are arranged in order from the object side toward the imaging device 20 side. Therefore, when machining the die for molding the lens frame 54, the machining process of the portions of the die corresponding to the first inner circumference surface 5602, the second inner circumference surface 5802 and the third inner circumference surface 6002 can be performed from only one direction. Therefore, the alignment accuracy of the inner diameters of the first inner circumference surface 5602, the second inner circumference surface 5802 and the third inner circumference surface 6002 can be greatly improved.

Accordingly, by simply press-fitting the outer circumference surfaces 4810, 5010, 5210 of the first through the third lenses 48, 50, 52 respectively to the first through the third inner circumference surfaces 5602, 5802, 6002, the optical axes of the first through the third lenses 48, 50, 52 can be positioned at high accuracy. Therefore, the relative shift decentering of the first lens 48, the second lens 50 and the third lens 52 in the second lens group 42 can be considerably decreased, and it becomes advantageous for actualizing alignment at extremely high accuracy among the first lens 48, the second lens 50 and the third lens 52.

(Conditional Expression)

Next, the optical conditions of the zoom lens 16 which is assembled into the lens barrel 18 of the present embodiment are further described.

The zoom lens 16 satisfies the following expression (1):

$$0.3 < |f2/(fw \cdot ft)^{1/2}| < 1.0 \quad (1)$$

where f2 denotes the combined focal distance of the second lens group 42, fw denotes the entire system focal distance at the wide-angle end of the zoom lens 16, and ft denotes the entire system focal distance at the telephoto end of the zoom lens 16.

The expression (1) is the conditional expression which defines the power of the second lens group 42 of the zoom lens 16.

When the power of the second lens group 42 ($|f2/(fw \cdot ft)^{1/2}|$) is smaller than 0.3, the power of the second lens group 42 becomes excessively strong. Accordingly, it becomes difficult to correct the off-axis aberration which occurs at the second lens group 42 when zooming. In addition, it becomes difficult for the optical design to suppress the decentering aberration which occurs when the first through the third lenses 48, 50, 52 are decentered.

Further, since the attachment accuracy for assembling the first through the third lenses 48, 50, 52 which are included in the second lens group 42 into the lens frame 54 becomes excessively high, attaching with position adjustment by equipment such as alignment device etc. may be necessary for manufacturing. It is disadvantageous because the cost may be increased extremely.

On the other hand, when the power of the second lens group 42 ($|f2/(fw \cdot ft)^{1/2}|$) becomes larger than 1.0, the power of the second lens group 42 becomes weak. Accordingly, it may be necessary to enlarge the dimension of the zoom lens 16 in the optical axis direction. Therefore, it is disadvantageous in performing miniaturization of the lens barrel 18 in total length.

When the zoom lens 16 satisfies the expression (1), it becomes easy to correct the off-axis aberration which occurs at the second lens group 42 when zooming and to suppress with the optical design the decentering aberration which occurs when the first through the third lenses 48, 50, 52 are decentered.

Further, since the attachment accuracy for assembling the first through the third lenses 48, 50, 52 which are included in the second lens group 42 into the lens frame 54 can be suppressed, attaching with position adjustment by equipment such as alignment device etc. may be unnecessary for manufacturing. Accordingly, it becomes advantageous in performing cost reduction.

Further, since the power of the second lens group 42 can be ensured, the dimension of the zoom lens 16 in the optical axis direction can be shortened. Therefore, it becomes advantageous in performing miniaturization of the lens barrel 18 in total length.

Accordingly, since the zoom lens 16 of the lens barrel 18 of the present embodiment is to satisfy the expression (1), it becomes even more advantageous in obtaining a compact and high performance lens barrel in which the assembling accuracy is capable to be high and the manufacturing cost is capable to be decreased.

EXAMPLES

Next, specific numerical examples of the zoom lens 16 in the present embodiment are described.

Table 1 shows the data of the zoom lens 16.

TABLE 1

F = 5.14~24.73 FNo = 3.3~5.37 ω = 38.7~8.7

| si | ri | di | ni | vi |
|---|---|---|---|---|
| 1 | 25.214 | 0.750 | 1.93323 | 20.71 |
| 2 | 17.558 | 2.431 | 1.80831 | 46.26 |
| 3 | 197.551 | (d3) | | |
| 4 | 44.756 | 0.500 | 1.80831 | 46.26 |
| 5 | 6.095 | 2.063 | | |
| 6 | 87.125 | 0.500 | 1.88815 | 40.56 |
| 7 | 7.335 | 0.723 | | |
| 8 (ASP) | 9.758 | 2.417 | 1.82918 | 23.86 |
| 9 (ASP) | 5.052E+05 | (d9) | | |
| 10 (ASP) | 4.908 | 1.321 | 1.69661 | 52.97 |
| 11 (ASP/STO) | −17.101 | 0.150 | | |
| 12 | 4.086 | 1.091 | 1.49845 | 81.20 |
| 13 | 28.986 | 0.400 | 1.91048 | 31.08 |
| 14 | 2.942 | (d14) | | |
| 15 (ASP) | 12.855 | 1.706 | 1.59412 | 66.76 |
| 16 (ASP) | −38.524 | (d16) | | |
| 17 | INFINITY | 0.330 | 1.51872 | 64.00 |
| 18 | INFINITY | 0.690 | | |
| 19 | INFINITY | 0.500 | 1.51872 | 64.00 |
| 20 | INFINITY | 0.600 | | |
| IMG | INFINITY | | | |

Table 2 shows variable spacing in accordance with the variable power of the zoom lens 16.

TABLE 2

| Variable intervals | | | |
|---|---|---|---|
| f | 5.14 | 11.29 | 24.73 |
| FNo | 3.3 | 4.08 | 5.37 |
| ω | 38.7 | 18.5 | 8.7 |
| d3 | 0.400 | 7.161 | 13.871 |
| d9 | 11.387 | 3.932 | 0.300 |
| d14 | 4.777 | 6.059 | 12.100 |
| d16 | 2.187 | 4.442 | 5.057 |

Table 3 shows an aspheric surface coefficient of each aspheric surface of the zoom lens 16.

TABLE 3

| | | Aspheric surface coefficient | | | |
|---|---|---|---|---|---|
| si | k | A | B | C | D |
| 8 | 0.05187 | −8.52936E−05 | −1.58620E−05 | 1.18099E−06 | −2.61136E−08 |
| 9 | 0.00000 | −2.62703E−04 | −1.42954E−05 | 1.16250E−06 | −3.24788E−08 |
| 10 | 0.00000 | −7.60897E−04 | −2.24476E−04 | 4.92808E−05 | −6.95411E−06 |
| 11 | 0.00000 | 5.82435E−04 | −3.41641E−04 | 8.54948E−05 | −1.09402E−05 |

TABLE 3-continued

| | | Aspheric surface coefficient | | | |
|---|---|---|---|---|---|
| si | k | A | B | C | D |
| 15 | 0.00000 | −3.81066E−04 | 7.08912E−05 | −5.38903E−06 | 1.36319E−07 |
| 16 | 0.00000 | −3.28899E−04 | 7.80046E−05 | −5.93756E−06 | 1.47937E−07 |

Table 4 shows the numerical value of the expression (1) of the example.

TABLE 4

| Conditional expression value | |
|---|---|
| $|f2/\sqrt{(fw \cdot ft)}|$ | 0.676 |

Here, meanings of the symbols used in Table 1 through Table 3 are as follows.
FNo: F number
f: Focal distance
ω: Half angle of view
si: "i"th surface from the object side
ri: Curvature radius of the surface si
di: Surface interval between the "i"th surface and the "i+1"th surface from the object side
ni: Refractive index at d line (wavelength 587.6 nm) of the "i"th lens
vi: Abbe number at d line (wavelength 587.6 nm) of the "i"th lens Further, the aspheric shape is defined by the following expression (2).

$$X = cy^2/(1+(1-(1+k)c^2y^2)^{1/2}) + Ay^4 + By^6 + \quad (2)$$

where x denotes the distance from the vertex of the lens face in the optical axis direction, y denotes the height in the direction perpendicular to the optical axis, c denotes the paraxial curvature at the vertex of the lens, k denotes a conic constant and A, B, . . . denotes an aspheric constant.

Further, in Table 1, "ASP" denotes that the surface has an aspheric shape, "STO" denotes that the surface has an aperture diaphragm and "INFINITY" denotes that the surface is flat.

Figure 11:
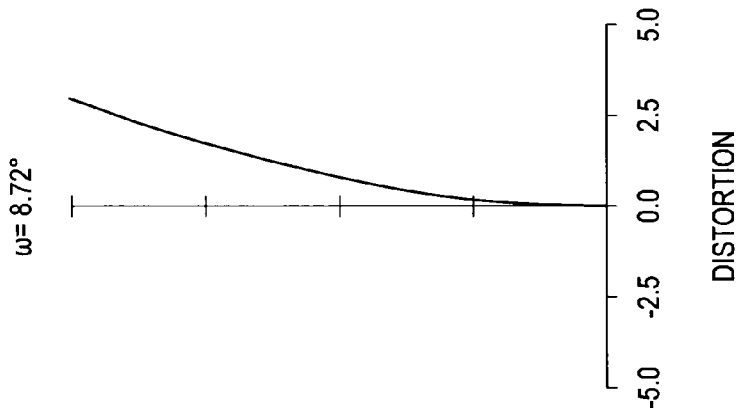
FIG. 11 is a longitudinal aberration diagram which shows distortion at the wide-angle end of the zoom lens 16.
Figure 10:
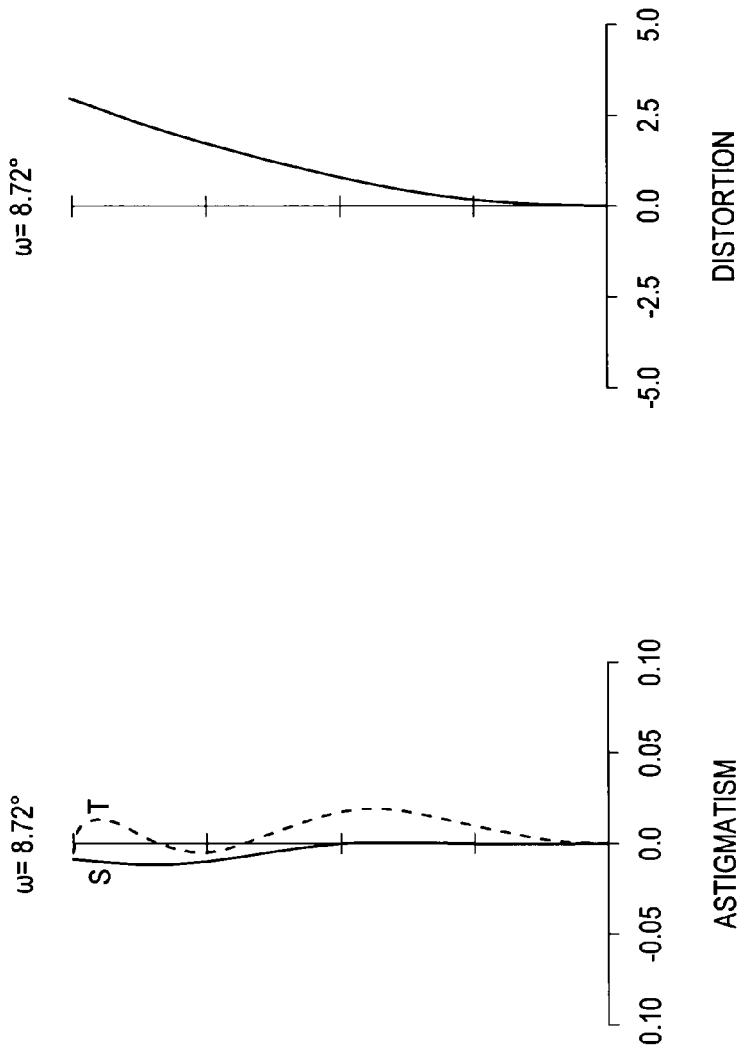
FIG. 10 is a longitudinal aberration diagram which shows astigmatism at the wide-angle end of the zoom lens 16.
Figure 9:
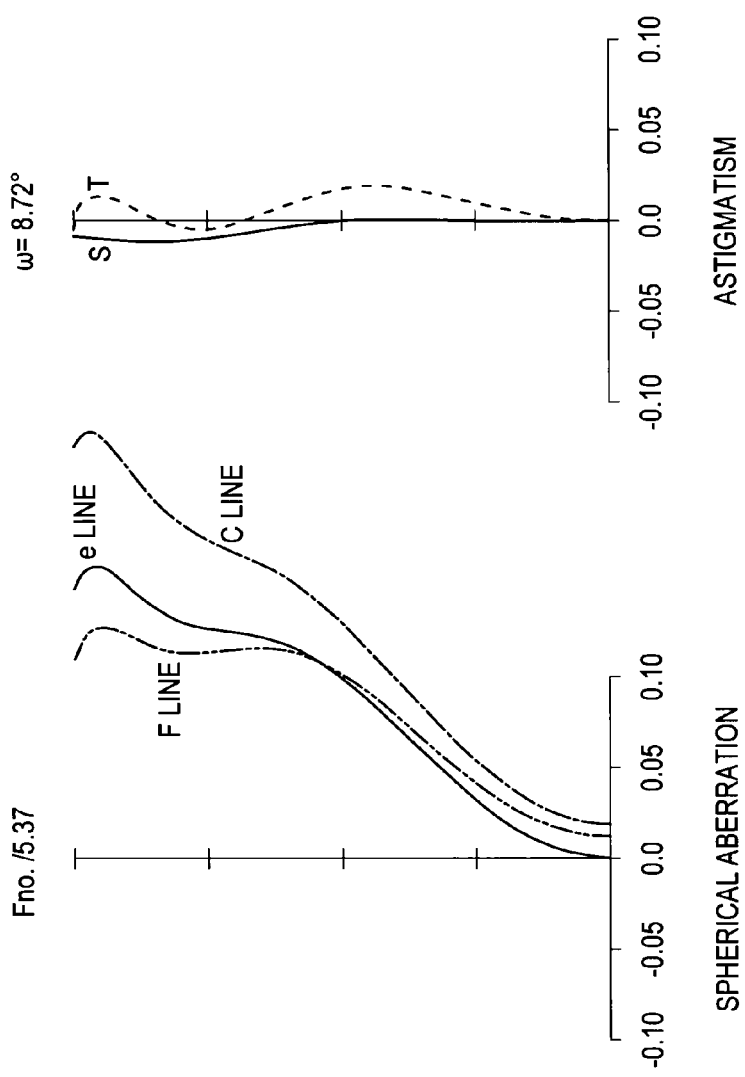
FIG. 9 is a longitudinal aberration diagram which shows spherical aberration at a wide-angle end of the zoom lens 16.

FIG. 9 through FIG. 11 are longitudinal aberration diagrams at the wide-angle end of the zoom lens 16. FIG. 9 shows spherical aberration, FIG. 10 shows astigmatism and FIG. 11 shows distortion.

FIG. 12 through FIG. 14 are longitudinal aberration diagrams at a middle-focal position of the zoom lens 16. FIG. 12 shows spherical aberration, FIG. 13 shows astigmatism and FIG. 14 shows distortion.

Figure 17:
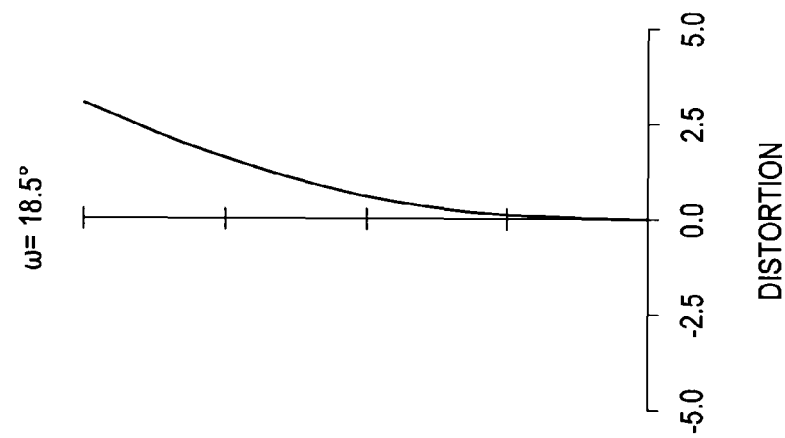
FIG. 17 is a longitudinal aberration diagram which shows distortion at the telephoto end of the zoom lens 16.
Figure 16:
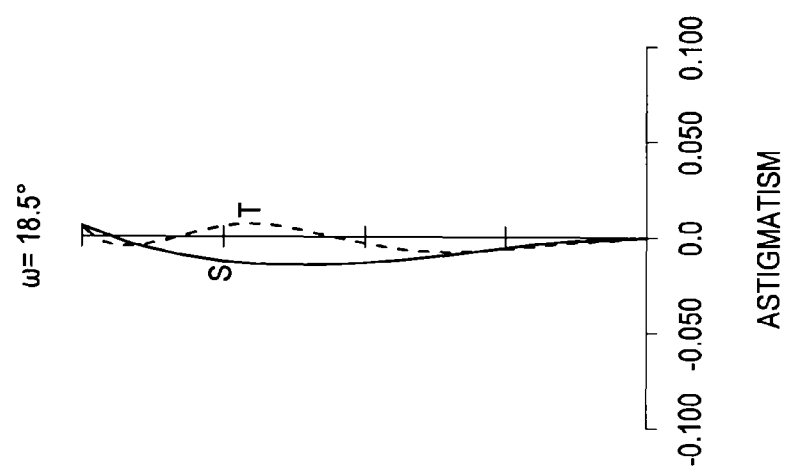
FIG. 16 is a longitudinal aberration diagram which shows astigmatism at the telephoto end of the zoom lens 16.
Figure 15:
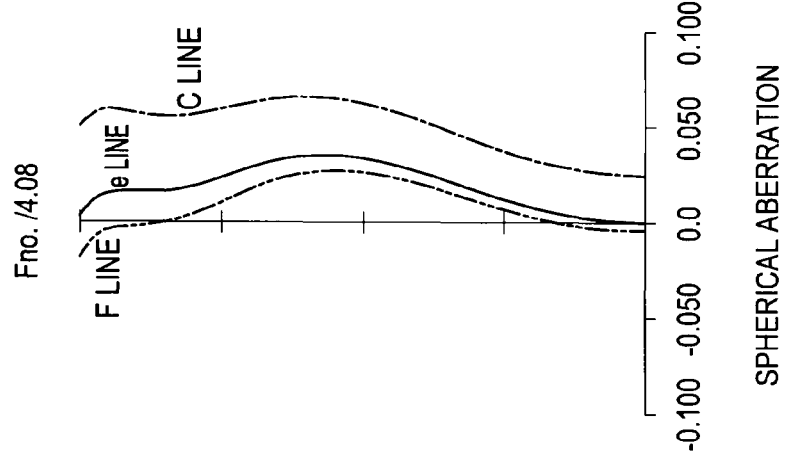
FIG. 15 is a longitudinal aberration diagram which shows spherical aberration at a telephoto end of the zoom lens 16.

FIG. 15 through FIG. 17 are longitudinal aberration diagrams at the telephoto end of the zoom lens 16. FIG. 15 shows spherical aberration, FIG. 16 shows astigmatism and FIG. 17 shows distortion.

As shown in FIG. 9 through FIG. 17, the aberrations of the zoom lens 16 according to the Examples are respectively corrected in good valance at every position of the wide-angle end position, the middle-focal position between the wide-angle end and the telephoto end, and the telephoto end position.

Here, in the present embodiment, the imaging apparatus 10 is shown as an example of an imaging apparatus. However, the present invention is surely applicable to various imaging apparatuses such as a video camera, a cellular phone with a camera, a PDA, a portable electronic instrument and the like.

It should be understood by those skilled in the art that various modifications, combinations, sub-combinations and alterations may occur depending on design requirements and other factors insofar as they are within the scope of the appended claims or the equivalents thereof.

What is claimed is:
1. A lens barrel comprising:
a photographing optical system which introduces an object image to an imaging device;
a zoom lens which is included in the photographing optical system; and
a barrel which accommodates the zoom lens;
wherein the zoom lens includes a first lens group having positive refractive power, a second lens group having negative refractive power, a third lens group having positive refractive power and a fourth lens group having positive refractive power, arranged in order from the object side toward the imaging device side,
the second lens group includes a first lens having a negative refractive power, a second lens having a negative refractive power whose diameter is smaller than that of the first lens, and a third lens having a positive refractive power whose diameter is smaller than that of the second lens, arranged in order from the object side toward the imaging device side,
the barrel includes a lens frame to which a first inner circumference surface, a second inner circumference surface and a third inner circumference surface are formed on the same axis,
the first lens, the second lens and the third lens are press-fitted at the outer circumferences thereof respectively to the first inner circumference surface, the second inner circumference surface and the third inner circumference surface so as to be accommodated in the lens frame,
the first lens is formed so that both lens faces at the object side and the imaging device side shape convex toward the object side and the curvature of the lens face at the imaging device side is larger than that of the lens face at the object side,
the second lens is formed so that both lens faces at the object side and the imaging device side shape concave so that the center portions of the lens faces are to become closer to each other,
the third lens is formed so that a lens face at the object side shapes convex toward the object side,
a ring-shaped first reference plane extending on a plane which is perpendicular to the optical axis of the first lens is formed at the periphery of the lens face at the imaging device side of the first lens,
a ring-shaped second reference plane extending on a plane which is perpendicular to the optical axis of the second lens is formed at the periphery of the lens face at the object side of the second lens, a ring-shaped third reference plane extending on a plane which is perpendicular to the optical axis of the second lens is formed at the periphery of the lens face at the imaging device side of the second lens, a ring-shaped fourth reference plane extending on a plane which is perpendicular to the optical axis of the third lens is formed at the periphery of the lens face at the object side of the third lens, and positioning of the first lens, the second lens and the third lens in the optical axis direction thereof is performed in the state that the first reference plane and the second reference plane are contacted and the third reference plane and the fourth reference plane are contacted.

2. The lens barrel according to claim 1, wherein the lens frame includes a first lens holding portion, a second lens holding portion and a third lens holding portion which respectively accommodates the first lens, the second lens and the third lens, the first inner circumference surface, the second inner circumference surface and the third inner circumference surface are respectively formed at the first lens holding portion, the second lens holding portion and the third lens holding portion, a ring-shaped fifth reference plane extending on a plane which is perpendicular to the optical axis of the third lens is formed at the periphery of the lens face at the imaging device side of the third lens, a positioning surface extending on a plane which is perpendicular to the center axis of the third inner circumference surface is formed at the third lens holding portion being capable to contact the fifth reference plane, and positioning of the first lens, the second lens and the third lens in the optical axis direction thereof against the lens frame is performed in the state that the third lens is contacted at the fifth reference plane to the positioning surface.

3. The lens barrel according to claim 1, wherein the following expression (1) is satisfied:

$$0.3 < |f2/(fw \cdot ft)^{1/2}| < 1.0 \qquad (1)$$

where f2 denotes the combined focal distance of the second lens group, fw denotes the entire system focal distance at a wide-angle end of the zoom lens, and ft denotes entire system focal distance at a telephoto end of the zoom lens.

4. The lens barrel according to claim 1, wherein at least one lens including the third lens among the first lens, the second lens and the third lens which are included in the second lens group is molded by a glass molding process.

5. An imaging apparatus having a lens barrel, the lens barrel comprising:

a photographing optical system which introduces an object image to an imaging device;

a zoom lens which is included in the photographing optical system; and a barrel which accommodates the zoom lens;

wherein the zoom lens includes a first lens group having positive refractive power, a second lens group having negative refractive power, a third lens group having positive refractive power and a fourth lens group having positive refractive power, arranged in order from the object side toward the imaging device side, the second lens group includes a first lens having a negative refractive power, a second lens having a negative refractive power whose diameter is smaller than that of the first lens, and a third lens having a positive refractive power whose diameter is smaller than that of the second lens, arranged in order from the object side toward the imaging device side, the barrel includes a lens frame to which a first inner circumference surface, a second inner circumference surface and a third inner circumference surface are formed on the same axis, the first lens, the second lens and the third lens are press-fitted at the outer circumferences thereof respectively to the first inner circumference surface, the second inner circumference surface and the third inner circumference surface so as to be accommodated in the lens frame, the first lens is formed so that both lens faces at the object side and the imaging device side shape convex toward the object side and the curvature of the lens face at the imaging device side is larger than that of the lens face at the object side, the second lens is formed so that both lens faces at the object side and the imaging device side shape concave so that the center portions of the lens faces are to become closer to each other, the third lens is formed so that a lens face at the object side shapes convex toward the object side, a ring-shaped first reference plane extending on a plane which is perpendicular to the optical axis of the first lens is formed at the periphery of the lens face at the imaging device side of the first lens, a ring-shaped second reference plane extending on a plane which is perpendicular to the optical axis of the second lens is formed at the periphery of the lens face at the object side of the second lens, a ring-shaped third reference plane extending on a plane which is perpendicular to the optical axis of the second lens is formed at the periphery of the lens face at the imaging device side of the second lens, a ring-shaped fourth reference plane extending on a plane which is perpendicular to the optical axis of the third lens is formed at the periphery of the lens face at the object side of the third lens, and positioning of the first lens, the second lens and the third lens in the optical axis direction thereof is performed in the state that the first reference plane and the second reference plane are contacted and the third reference plane and the fourth reference plane are contacted.

* * * * *